3,493,550
PLASTICIZED ASSOCIATED POLYMERS
Joseph Michael Schmitt, Ridgefield, and Jeffrey Rufus Sherry, Danbury, Conn., assignors to American Cyanamid Company, Stamford, Conn., a corporation of Maine
No Drawing. Filed July 3, 1967, Ser. No. 650,646
Int. Cl. C08f 15/00
U.S. Cl. 260—86.1      9 Claims

ABSTRACT OF THE DISCLOSURE

An interfacial process is disclosed for obtaining thermoplastic polyvalent metal-bridged polymers based on major amounts of methyl methacrylate and having a minor content of carboxylic acid groups. Improved compositions therefrom are also featured.

BACKGROUND OF THE INVENTION

The present invention relates to the field of bridging certain methacrylate polymers containing a limited amount of free, reactive acid groups. Bridging is by means of certain polyvalent metal compounds and is effected in such a manner as to retain the thermoplastic nature of the polymer.

The closest prior art of which we are aware is that contained in U.S. Patent No. 2,726,230, issued Dec. 6, 1955 to Carlson. In the cited reference, polymers based on alkyl esters of acrylic acid and having a free acid content derived from a copolymerizable acid are bridged with a metal oxide by blending said ingredients, heat milling said blend, and curing the milled blend to produce a thermoset composition. Although plasticization is contemplated, no specific showing is made as to the effects thereof.

In the present case, methyl methacrylate polymers are bridged with metal compounds by an improved process which enables thermoplasticity of the polymers to be retained. The properties of acrylate ester polymers per se inherently differ from those of methacrylate ester polymers thereby resulting in dissimilar problems with respect to the bridging and plasticization thereof. A knowledge of bridging techniques with respect to acrylate ester polymers in producing thermoset compositions therefore does not provide useful knowledge for the solution of problems associated with bridging of methacrylate ester polymers while retaining thermoplasticity thereof.

SUMMARY OF THE INVENTION

This invention relates to the bridging of polymers based on major amounts of methyl methacrylate and having a content of free, reactive carboxylic acid groups by means of a suitable metal compound. More particularly, it relates to an improved process for effecting such bridging without loss of thermoplasticity which comprises interfacially contacting a solution or dispersion of a metal compound with a solution of a suitable polymer such that the desired bridging is effected.

The term "bridging" as employed herein denotes an extrinsic association between adjacent linear polymer chains. The association has the effect of reversibly cross-linking the polymer chains even though the bridging is accomplished through ionic bonding of the two chains with a single polyvalent metal ion forming a mutual salt therebetween. In the classical meaning of the term "cross-linking," the union of the two polymer chains is the result of covalent bonds which lead to thermoset polymers. In the present case, the ionic bonds provide the strengthening effects of cross-links below the shaping temperature of the polymer but do not interfere with the mobility of the polymer chains at or above the shaping temperature. In effect, the specific location of the ionic cross-links is only fixed below the shaping temperature and at or above this temperature the ionic cross-links may form, break, and reform at different locations depending upon the orientation of the polymer chains during the shaping operation, thus accounting for the thermoplasticity of the polymer.

Numerous commercially available polymers and copolymers are useful as plastic rubbery materials in the unmodified form in which they are produced. Some polymers, however, are inherently rigid and strong and require plasticization or other modification for certain uses or to be amenable to more favorable molding operations. Other polymers are inherently soft and weak and require hardening and strengthening to be useful in many applications. The conventional procedures for effecting plasticization or strengthening, however, leave much to be desired in the properties of the modified polymers. Thus, the inherently rigid and strong polymers, when effectively plasticized, generally lose too much in the way of rigidity and strength. The inherently soft and weak polymers, on the other hand, when effectively strengthened, generally become so rigid and unpliable as to create problems in the normal molding operations due to loss of thermoplasticity. Thus, although means for modifying the inherent properties of certain polymers are known, there exists a continuing need for an improved modifying means whereby a good balance of properties is retained in the final modified polymer.

The modification potential inherently possessed by polymers and copolymers which contain reactive groups pendant from their linear chains has long been recognized and advantage taken thereof. In the fields of textiles and rubber, for example, use is made of polyfunctional reactive compounds to effect cross-linking of natural or synthetic polymers through pendant reactive sites. In the field of plastics, advantage is taken of certain pendant reactive groups to effect bridging of polymer chains and improve polymer strength thereby through irreversible ionic cross-linking.

In the above cited reference, the acrylic acid ester polymers employed are inherently soft and weak relative to other polymer types and are benefitted by the strengthening process disclosed therein. These polymers, by virtue of a free acid content, when mixed with a suitable polyvalent metal compound, milled at a temperature above their melting points, and subsequently thermoset, yield compositions of good strength properties and rigidity. The process of strengthening, however, has the disadvantage of requiring lengthy cures at higher than normal molding temperatures, thereby causing impairment of many otherwise desirable properties in the molded article, especially color. In addition, besides the loss of thermoplasticity of the polymers, only limited strength improvements over the unmodified polymers are possible before the difficulties of molding become insurmountable.

An alternative prior art method of effecting metal bridging of polymers containing pendant acid groups is that of milling the polymer with a metal alkyl or alkoxide at temperatures above the softening point of the polymer to form an intimate mixture thereof and subsequently curing the resulting mixture. This process is generally effective with plasticized alkenyl aromatic polymers in attempting to provide a good balance of physical properties. The process, however, is of limited application as to other polymer systems, requires expensive and limitedly available metal compounds, and is only moderately successful. A process of this type is described in U.S. Patent No. 3,216,964, issued Nov. 9, 1965.

Still another known method for bridging polymers containing pendant acid groups is that of treating the polymer with a metal oxide in the presence of solvent capable of effecting solution of the ingredients. The solution which forms is heated to effect the desired bridging. The resulting incipient bridging, however, leads to viscosity increases which require extensive dilution with additional solvent to enable continuing bridging to be effected. For example, employing an initial 9:1 ratio of solvent to polymer, a subsequent four-fold increase in solvent usage is required to enable control of the continuing reaction. The solution, after the reaction is complete, is filtered and the bridged polymer which remains in solution is recovered by precipitation through the addition of a suitable non-solvent. In addition to the high quantities of solvent required, this method is disadvantageous because the method of bridging is difficult to control, requires a separate step for the addition of plasticizer since the precipitating non-solvent can extract considerable amounts of plasticizer if concurrently present, causes loss of thermoplasticity, generally produces molded compositions of poor optical clarity, and does not always lead to the desired level of strength improvement in the plasticized compositions. This process is described in connection with butadiene acrylic acid copolymers by W. Cooper, J. Polymer Sc., 28, 195 (1958).

In a recently issued patent, U.S. 3,322,734, Rees, May 30, 1967, ionic linking of methyl methacrylate polymers having an acid content is effected in one-phase solvent solutions of polymer and metal compound to obtain some strength improvements. The metal compounds preferred by Rees are monovalent and when polyvalent metal compounds are employed, difficulties in molding are encountered. The effective monovalent metal compounds do not result in significant strength increases in plasticized polymers.

While certain other bridging methods are known, they are generally not pertinent to the specific type of polymers of the present invention and otherwise possess one or more of the deficiencies recited hereinabove in connection with the other bridging methods. There exists, therefore, the continuing need for improved methods for the bridging of polymers with metal compounds which enable high strength values to be obtained in the formed polymers while retaining thermoplasticity therein and to overcome other deficiencies of known methods.

It has now been discovered that a bridged polymer is readily produced which, when subsequently plasticized and shaped, unexpectedly yields highly desirable strength values and a good balance of other inherent properties including retained thermoplasticity, if the bridging of polymer with metal compound is carried out in the interface formed by mixing separate phases of metal compound and polymer in mutually immiscible and insoluble media. Such process of bridging, in addition, eliminates or minimizes most, if not all, of other deficiencies of the known methods discussed above.

DESCRIPTION OF THE INVENTION INCLUDING PREFERRED EMBODIMENTS

According to the present invention, there are formed two separate phases, one containing the metal compound and the other, the carboxylic polymer, preferably in conjunction with an effective amount of plasticizer. The media used in preparing the separate phases are different and are so selected as to be mutually insoluble and immiscible and thus give rise to an interface when the resulting phases are mixed. The two phases are then mixed and kept in intimate contact with one another, preferably at ambient temperature, by the use of agitation during the bridging reaction. Generally, some heat rise will be observed as a result of the mechanical work increase caused by increased viscosity arising from incipient bridging. External heating is not required but may be employed to the extent that resulting solvent loss is not critical. After the bridging reaction is essentially complete, as evidenced by a leveling off of the viscosity, the phases are separated. The phase containing the polymer is stripped of solvent and dried. The dried polymer composition is then capable of being molded at normal conditions into shaped articles of highly desirable properties, including high tensile product even in the presence of copious plasticizer.

The process of the present invention is effective with polymers containing major amounts of methyl methacrylate. Among the polymers that may be improved according to the process of the present invention are those containing major amounts of methyl methacrylate and a minor content of carboxylic acid groups. The carboxylic acid groups may arise as the result of copolymerizing a suitable unsaturated carboxylic acid with methyl methacrylate or may arise as a result of partial hydrolysis of any ester group contained in the monomer used in forming the polymer. In addition to the methacrylate and acid content of the polymer, there may be included one or more additional comonomers copolymerizable therewith in amounts such that the major content of methyl methacrylate is retained.

In general, the carboxylic acid content of the polymer should range from about 0.5% to about 10%, by weight, based on the total weight of the polymer composition. This content may be of a copolymerizable unsaturated carboxylic acid or hydrolyzed ester employed in forming the polymer, as previously indicated. The preferred range of carboxylic acid content is between about 1% and 5%, same basis. Among the copolymerizable unsaturated carboxylic acids that may be employed are included acrylic, alpha-chloroacrylic, methacrylic, ethacrylic, maleic, fumaric, crotonic, itaconic, angelic, tiglic, and the like as well as mixtures thereof. In producing the carboxylic acid content by partial hydrolysis of the esters present in the polymer, the procedure described in U.S. Patent No. 2,649,439, Brown, issued Aug. 18, 1953, may be used.

As indicated, the polymer may be initially a homopolymer of methyl methacrylate which has been partially hydrolyzed to produce the desired acid content. It may also be a copolymer of methyl methacrylate and a copolymerizable unsaturated carboxylic acid to provide the acid content in the range previously indicated. One or more additional comonomers, especially hydrolyzable esters, may also be present but only to the extent that the methyl methacrylate content is at least about 50% of the total polymer composition by weight. Among the comonomers that may be included in the composition of the polymers of the present invention are known monoethylenically unsaturated comonomers normally employed in such copolymerizations. The comonomers include acrylamide, N,N-diethyl acrylamide, vinyl acetate, acrylonitrile, styrene, isobutylene, vinyl halides, ethyl acrylate, butyl acrylate, etc. and the like as well as mixtures thereof. The comonomer content, as indicated above, will range from 0% to about 49.5% based on the weight of the total polymer composition. The usage level of any particular comonomer will also be dependent upon the inherent properties of the copolymer produced, as indicated above.

The polymers may have a wide range of molecular weights and still be useful in the present invention. The polymers may have molecular weights ranging from one thousand to three million. Generally the polymers most widely used in the formation of shaped articles are useful in the present process with those having molecular weights between about 10,000 and 350,000 being preferred.

The solvent useful in dissolving the copolymer to effect the interfacial bridging is one which will not be miscible with or soluble in the medium used to prepare the metal compound solution or dispersion. This requirement restricts the number and type of solvents that may be employed. In general, chlorinated hydrocarbons of both aliphatic and aromatic variety are eminently suitable as solvents in the process of the present invention, with the preferred solvent being chloroform by virtue of its volatility and resulting easy removability from the bridged polymer. Other solvents, including mixtures, are also useful as long as they meet the restrictions previously stated. It is not possible to mention a complete list of useful solvents without taking into account the acid content of the polymer, the composition of the polymer with respect to comonomers, the molecular weight of the polymer and other factors, however, such solvents as the ketones, i.e. methyl ethyl ketone, methyl isobutyl ketone, acetone; the esters, i.e. ethyl acetate; aromatics, i.e. benzene, toluene, naphthalene, dimethyl formamide, dioxane, tetrahydrofuran and the like are exemplary. It is obviously clear, therefore, that if the solvent which dissolves the polymer is immiscible with and insoluble in the medium employed with the metal compound, it is useful in the present inventive process.

The amount of solvent for the polymer which is employed may vary widely and depends primarily upon the nature of the polymer and the solvating power of the solvent. The preferred range is generally between about 2 and 9 parts of solvent per part of polymer on a weight basis. Higher concentrations are generally uneconomical while lower concentrations generally do not provide a useful viscosity for the resulting solution. Where chloroform is the solvent for the polymer, for example, a usage of about 3–4 parts of solvent to 1 part of polymer, both by weight, has proven effective.

The metal compounds useful in the process of the present invention are those wherein the metal therein is at least bivalent and may even be of higher valency, i.e. polyvalent. The metal compound may be in any form, such as, for example, an oxide, a hydroxide, a salt, etc. Among the metals which are useful include zinc, magnesium, cadmium, titanium, aluminum, barium, strontium, copper(ic), cobalt, tin, iron, lead and the like. Typical compounds include calcium oxide, magnesium oxide, barium oxide, strontium oxide, calcium hydroxide, barium hydroxide, aluminum sulfate, barium chloride, calcium chloride, strontium chloride, cupric chloride, cobaltic chloride, ferrous chloride, ferric chloride, barium nitrate, calcium nitrate, cadmium nitrate, lead nitrate, stannous chloride, stannic chloride, zinc nitrate, titanium trichloride, and the like.

Although it is generally preferable to employ metal compounds that are completely soluble in the medium employed therewith, this is not a necessary restriction. Thus, even those compounds which have only limited solubility in the medium may be employed as dispersions of excess metal compound, since, as dissolved metal ions are used up in the bridging reaction, more metal compound will dissolve to maintain the solubility product, thereby enabling the limitedly soluble metal compounds to be effectively employed.

Any medium for preparing the metal compound phase may be used as long as it is one which is immiscible with and insoluble in the polymer phase, dissolves the metal compound to at least a limited extent as previously indicated, and is essentially unreactive with the metal compound. In numerous instances, water is a useful solvent or medium and is preferred for economic reasons. Its hydrating effect upon certain metal oxides is not detrimental since the hydrated oxides or hydroxides thus formed are effective in the bridging reaction and in many cases are more soluble than the original oxides. Other materials which may be used include alcohols such as ethyl alcohol, aliphatic hydrocarbons such as heptane, hexane and the like.

The volume of the metal compound phase employed in preparing the interfacial mixture will generally vary from about 0.1 to 3 times the volume of the polymer phase. Preferably, the volume of the metal compound phase is from about 1 to 2 times the volume of the polymer phase. The amount of metal compound used is that which will produce metal ions equivalent to the acid functionality of the copolymer.

Although it is generally preferred to employ the metal compound in amounts which are equivalent to the acid functionality of the polymer employed, it is possible to use less than this amount, especially where the acid content of the polymer is near or at the upper limit previously indicated. It is also possible to use an excess of metal compound, if desired, although no particular benefits accrue thereby.

When the two phases prepared as indicated above are mixed, it is necessary to provide agitation in order to carry out the bridging reaction effectively, the agitation increasing the interfacial contact of the two phases. For this purpose, a variety of agitation methods are suitable. It is generally preferable to employ agitators that are capable of handling viscous liquids, since the polymer solution becomes increasingly viscous as the bridging reaction progresses. A sigma mixer is particularly effective. Other mixers, such as those useful in kneading and dough-mixing operations, are also effective, there being no criticality in the particular type used.

While it is not necessary to heat the reaction mixture to obtain effective bridging, it is possible to conduct the bridging reaction over a wide range of temperatures. It is convenient to conduct the reaction at temperatures in the range of about 20 to 40° C., since these temperatures require no special provisions for attainment. The higher temperatures in the range generally arise from the mechanical work increase due to viscosity increases. Lower temperatures may be employed but generally do not provide any special advantage. Higher temperatures may also be employed if desired or otherwise found necessary. Care should be exercised to avoid undue loss of media since resulting viscosity increases can interfere with providing the necessary interfacial contact to effect the degree of bridging desired. The provision of closed mixers and/or reflux condensers can minimize media loss. The provision for sub and superatmospheric pressures is also contemplated where necessary to extend the working temperature range.

The length of time required to effect the bridging reaction will vary depending upon the acid content of the copolymer, the temperature at which the reaction is conducted, the nature of the agitation furnished and the metal compound employed in the bridging reaction. Times of up to about 24 hours are generally adequate in the temperature range of 20 to 40° C. Shorter times are generally required at higher reaction temperatures. As mentioned above, the leveling off of the viscosity determines when the reaction is essentially complete.

When the bridging reaction is essentially complete, the media are separated. This separation can generally be effected by decantation when the agitation is stopped, since the two media are immiscible with and insoluble in one another. The polymer phase is then freed of solvent and the recovered polymer is ready for use in the molding operations normally associated with it. Solvent removal is preferably carried out by vacuum drying at temperatures well below those values which can deteriorate the polymer. Using chloroform as the solvent for the polymer, for example, vacuum drying at 60° C. for several hours is effective. The manner employed in effecting solvent removal, however, is not especially critical, and known techniques may be employed as long as deterioration of the polymer is avoided.

The polymer bridged in the manner described above is characterized as being completely soluble in dimethyl formamide when dried. This characterization is unique compared with the results obtained with polymers bridged by other methods. The other methods yield a bridged polymer which is only partially soluble in this solvent, leaving considerable amounts of insoluble and intractable polymer incapable of being satisfactorily molded under normal molding conditions.

As previously indicated, it is generally preferable to incorporate a plasticizer in the polymer phase during the bridging reaction, since such incorporation eliminates the subsequent step of adding plasticizer before molding and improves processability. In adding plasticizer to the polymer phase, choice of plasticizer or solvent should be such as to effect solution in the polymer phase. Suitable plasticizers are any of the many known plasticizers for poly(methyl methacrylate). Particularly good plasticizers are esters of dibasic acids and alcohols of 4 or more carbon atoms. Suitable plasticizers, for example, include tricresyl phosphate, cresyl diphenyl phosphate, triphenyl phosphate, dibutyl phthalate, di-2-ethylhexyl phthalate, dioctyl phthalate, dioctyl azelate, diisooctyl adipate, dioctyl sebacate, and various polyether and polyester compounds. The effective use level of plasticizer will vary depending upon the polymer employed, the choice of plasticizer, the effect desired in the formed article, etc. Generally, the plasticizer may be used in concentrations of up to about 50%, by weight, based on the weight of the polymer. A preferred concentration range is generally from about 20% to about 40%, same basis.

While it is generally preferable to add the plasticizer to the polymer phase prior to the bridging reaction, it is to be understood that addition may be made subsequent to the bridging reaction, if desired. Thus, the plasticizer may be added to the polymer phase after bridging either before or after drying the bridged polymer. When added before drying, the plasticizer can generally be cold-worked into the mixture of polymer and solvent and the resulting blend can be subsequently dried. Alternatively, after drying the bridged polymer, the plasticizer may be hot-milled into the polymer by usual techniques employed with unbridged polymers.

The products obtained in accordance with the process of the present invention range from very hard and rigid thermoplastics, through rubbery materials, to soft pliable substances, depending upon the density of ionic bonds, the selected plasticizer and its concentration, and the balance between the two. Thus, the same basic copolymer, which has numerous uses in its unmodified form, can be suitably modified to extend its range of utility into areas where it formerly was considered too hard in unplasticized form or too soft and too weak in plasticized but unbridged form by utilizing the process of the present invention. The polymeric materials of the present invention are useful, for example, as clear and translucent unsupported films or sheets of high strength, as coated and calendered fabrics such as upholstery materials, as electrical insulation, in the preparation of aqueous coating compositions and lacquers, as cements, etc. as well as in the formation of shaped (molded) articles. The modification in properties of the polymers that are obtainable in accordance with the process of the present invention increase the versatility of use and industrial acceptability of the products formed.

The invention is more fully illustrated in the following examples wherein the parts and percentages are by weight unless otherwise specifically stated. The examples are intended to be illustrative only and not as limitations on the scope of the invention except as set forth in the appended claims.

EXAMPLE 1.—(COMPARATIVE)

This example illustrates the bridging method described by Cooper, J. Polymer Sci. 28, 195 (1958).

To a suitable reaction vessel, equipped with a stirrer, heating mantle, reflux condenser with calcium sulfate drying tube and thermometer, are added 175 parts of a 95/5 methyl methacrylate/methacrylic acid copolymer, and 1575 parts of dimethyl formamide. To the polymer solution at 55° C. are added 3.6820 parts (1.5 equivalents based on acid content of the copolymer) of calcium oxide. The resultant cloudy solution is heated to 100° C. with stirring and held there for 72 hours. During this time, the solution becomes a high viscosity substance that climbs the stirrer shaft. The addition of 5250 parts of dimethyl formamide or three times the original charge is necessary to yield a low viscosity filterable solution. Filtration is also necessary to remove undissolved calcium oxide. The filtered solution is precipitated by the addition of 10 parts of methanol for each part of polymer solution. The precipitated polymer is then washed with methane and water. The dried polymer is shown by analysis to contain 0.85% calcium (calculated theoretical amount 1.00%).

The polymer thus produced is plasticized with 40% of cresyl diphenyl phosphate by blending the ingredients on a rubber mill after heating components in a sealed tube at 200° C. A sample of the original polymer not bridged with metal compound is similarly plasticized. Both samples are then subjected to molding by conventional techniques. A sample of the original polymer which had been neither bridged with metal compound nor plasticized is also molded for comparison purposes.

The plasticized polymers, whether or not bridged, are pliable and readily extruded. Tensile strength and elongation at the break are determined on the various samples in accordance with standard ASTM test methods. Values for tensile product are then determined by multiplying the numerical values of the determined tensile strength and elongation. These results are recorded in Table I.

Table I

| Sample: | Tensile product |
| --- | --- |
| Unbridged and unplasticized | $4.8 \times 10^4$ |
| Unbridged and plasticized | $6.6 \times 10^4$ |
| Bridged and plasticized | $26.7 \times 10^4$ |

These results indicate that the process described results in a plasticized polymer of increased toughness as indicated by the tensile product. The process, however, has the deficiency of high solvent usage.

EXAMPLE 2.—(COMPARATIVE)

This example illustrates the process of U.S. Patent No. 3,216,964 as it applies to methyl methacrylate polymers.

To a suitable mixer are added 900 parts of a 95/5 methyl methacrylate/methacrylic acid copolymer and 600 parts of dibutyl phthalate. A homogeneous solution is obtained after mixing at 140–145° C. overnight. 400 parts of the plasticized copolymer are placed on a rubber mill at 100° C. and to this are added 6.15 parts (0.75 equivalent based on the acid content of the copolymer) of aluminum isopropoxide dissolved in a small quantity of chloroform. The milling is continued for 10 minutes after the addition, during which time the chloroform evaporates. The finished product is grainy in appearance. Treatment of a sample of this product with dimethyl formamide reveals a large portion of it to be insoluble therein.

The bridged and plasticized copolymer is then molded and tested as in Example 1. The molded product yields a Tensile Product of $7.4 \times 10^4$, or virtually no improvement over the unbridged and plasticized sample as shown in Table I of Example 1.

Additional trials varying the number of equivalents of aluminum isopropoxide and substituting magnesium methoxide for aluminum isopropoxide at several equivalent levels yield essentially identical results, including the grainy appearance and large insoluble copolymer portions.

This example illustrates the unsuitability of the process described for modifying methyl methacrylate copolymers.

EXAMPLE 3.—(COMPARATIVE)

This example illustrates the process of U.S. Patent No. 2,726,230 as it applies to methyl methacrylate copolymers.

To a suitable mixer are added 900 parts of a 95/5 methyl methacrylate/methacrylic acid copolymer and 600 parts of dibutyl phthalate. A homogeneous solution is obtained after mixing at 140–145° C. overnight. 400 parts of the plasticized copolymer are placed on a rubber mill at 100° C. and to this are added 3.68 parts (0.75 equivalent based on the acid content of the copolymer) of zinc oxide. The milling is continued for 10 minutes.

The bridged and plasticized copolymer is then molded and tested as in Example 1. The tensile product of the molded product shows no improvement over the unbridged and plasticized sample as shown in Table I of Example 1. This result illustrates the unsuitability of the process described for modifying methyl methacrylate copolymers.

Another portion of the bridged and plasticized copolymer is compression molded for 40 minutes at 270° C. While the molded product obtained in this manner has an improved tensile product over the unbridged and plasticized sample previously referred to, the product is not thermoplastic as indicated by its inability to be reshaped in a molding operation. This example further illustrates that while the process described may be effective in increasing the tensile product of plasticized methyl methacrylate copolymers, it causes loss of thermoplasticity of such polymers in such cases.

EXAMPLE 4.—(COMPARATIVE)

This example illustrates the process of U.S. Patent No. 3,322,734 as it applies to methyl methacrylate copolymers.

Example 7 of the cited patent is followed up thru the point where the ionically linked copolymer is produced. The linked copolymer is then plasticized and molded in the manner described in Example 1, above. The molded article shows no significant improvement in tensile product over that of the unbridged and plasticized polymer as shown in Table I, above.

This example illustrates the unsuitability of the process of the cited patent for modifying methyl methacrylate polymers.

EXAMPLE 5

To a suitable mixer at room temperature are added 120 parts of a 95/5 methyl methacrylate/methacrylic acid copolymer, 80 parts of dibutyl phthalate, and 400 parts of chloroform. After solution is effected, 9,432 parts (1 equivalent based on the acid content of the copolymer) of barium hydroxide, dissolved in 500 parts of deionized water, are added with agitation. Mixing is continued overnight. The temperature rises from an initial 30° C. to 37° C. due to the mechanical work increase caused by the viscosity increase. The water phase is decanted leaving an opaque white mass. This white mass is completely soluble in dimethyl formamide. The chloroform is removed by vacuum drying at 60° C. A sample of the product obtained after drying is still completely soluble in dimethyl formamide.

The product obtained above is then molded and tested as in Example 1. The molded article is almost colorless and is pliable. Its tensile product is $34.6 \times 10^4$. This value is five times greater than that of the unbridged and plasticized sample as shown in Table I of Example 1. This value is also an improvement of approximately 30% over the value obtained by the process described in Example 1 and is achieved without the deficiencies noted in connection with said example.

Thermoplasticity of the product obtained in the present example is illustrated by its ability to be reshaped repeatedly by molding without significant modification of the properties initially produced upon molding.

EXAMPLE 6

The procedure of Example 5 is repeated in every material detail except that for the copolymer employed therein there is substituted an equal amount of a homopolymer of methyl methacrylate which has been then hydrolyzed to the same acid content as the polymer of Example 5 by the process disclosed in U.S. Patent No. 2,649,439. The molded product exhibits similar properties to those obtained with the copolymer of Example 5.

EXAMPLES 7-27

Following the procedure of Example 5 in every material detail except for the polymer employed, an additional series of bridged polymers is prepared as summarized in the following Table II.

Table II

| Example | Polymer |
| --- | --- |
| 7 | 99.5/0.5 methyl methacrylate/methacrylic acid. |
| 8 | 90/10 methyl methacrylate/methacrylic acid. |
| 9 | 95/5 methyl methacrylate/acrylic acid. |
| 10 | 95/5 methyl methacrylate/alpha-chloroacrylic acid. |
| 11 | 95/5 methyl methacrylate/ethacrylic acid. |
| 12 | 95/5 methyl methacrylate/ethacrylic acid. |
| 13 | 95/5 methyl methacrylate/maleic acid. |
| 14 | 95/5 methyl methacrylate/fumaric acid. |
| 15 | 95/5 methyl methacrylate/crotonic acid. |
| 16 | 95/5 methyl methacrylate/itaconic acid. |
| 17 | 95/5 methyl methacrylate/angelic acid. |
| 18 | 95/5 methyl methacrylate/tiglic acid. |
| 19 | 80/5/15 methyl methacrylate(MMA)/acrylic acid/acrylamide. |
| 20 | 80/5/15 MMA/methacrylic acid/N,N-diethyl acrylamide. |
| 21 | 80/5/15 MMA/acrylic acid/vinyl acetate. |
| 22 | 80/5/15 MMA/acrylic acid/isobutylene. |
| 23 | 80/5/15 MMA/acrylic acid/vinyl chloride. |
| 24 | 80/5/15 MMA/maleic acid/ethyl acrylate. |
| 25 | 80/5/15 MMA/itaconic acid/butyl acrylate. |
| 26 | 50/5/45 MMA/acrylic acid/styrene. |
| 27 | 65/5/30 MMA/acrylic acid/acrylonitrile. |

The properties of the molded products produced from the resultant bridged polymers are similar to those observed in the product of Example 5.

EXAMPLES 28-48

Following the procedure of Example 5 in every material detail except for the metal compound employed, an additional series of bridged polymers is prepared substituting in individual runs, one of the following metal compounds for the barium hydroxide therein in an equivalent amount; calcium oxide, magnesium oxide, barium oxide, strontium oxide, calcium hydroxide, aluminum sulfate, barium chloride, calcium chloride, strontium chloride, cupric chloride, cobaltic chloride, ferrous chloride, ferric chloride, stannous chloride, stannic chloride, titanium trichloride, barium nitrate, cadmium nitrate, calcium nitrate, lead nitrate, and zinc nitrate. The molded products exhibit essentially the same properties in every case as those observed in the product of Example 5.

We claim:
1. A process for ionically cross-linking a copolymer containing a major amount of methyl methacrylate and having an acid content from 0.5 to about 10%, by weight, based on the weight of the total composition, which comprises interfacially contacting with agitation a solvent solution of said polymer with a phase of a metal compound which is at least bivalent and capable of ionic cross-linking, said metal compound phase being in a medium which is immiscible with and insoluble in the polymer solution.

2. The process of claim 1 wherein the polymer solution contains dissolved therein an effective amount of a plasticizer for the polymer.

3. The process of claim 1 wherein the polymer is a copolymer of methyl methacrylate and a copolymerizable ethylenically unsaturated carboxylic acid in the range of about 99.5–90% to 0.5–10%, by weight, respectively.

4. The process of claim 1 wherein the methyl methacrylate polymer is hydrolyzed.

5. The process of claim 1 wherein the polymer solvent is chloroform.

6. The process of claim 1 wherein the medium for the metal compound is water.

7. The process of claim 1 wherein the metal compound phase and polymer solution are in the ratio of 0.1–3 to 1, respectively, by weight.

8. An ionically cross-linked and plasticized polymer obtained by the process of claim 2.

9. An extrusion molded article of improved Tensile Product obtained by suitably molding the polymer of claim 8.

References Cited

UNITED STATES PATENTS

| | | | |
|---|---|---|---|
| 3,070,583 | 12/1962 | Uraneck et al. | 260—82.1 |
| 3,264,272 | 8/1966 | Rees | 260—78.5 |
| 3,324,074 | 6/1967 | McManimie | 260—41 |
| 3,355,319 | 11/1967 | Rees | 117—122 |

JOSEPH L. SCHOFER, Primary Examiner

J. C. HAIGHT, Assistant Examiner

U.S. Cl. X.R.

260—31.2, 31.6, 31.8, 32.6, 32.8, 33.2, 33.4, 33.6, 33.8